US006443800B1

(12) United States Patent
Rice

(10) Patent No.: US 6,443,800 B1
(45) Date of Patent: Sep. 3, 2002

(54) MUSICAL ADAPTER FOR BABY BOTTLES

(76) Inventor: Timm Rice, 889 S. Rainbow Blvd. PMB #142, Las Vegas, NV (US) 89145

( * ) Notice: Subject to any disclaimer, the term of this patent is extended or adjusted under 35 U.S.C. 154(b) by 0 days.

(21) Appl. No.: 09/738,137

(22) Filed: Dec. 16, 2000

(51) Int. Cl.[7] .................................................. G01F 1/00

(52) U.S. Cl. ......................... 446/227; 446/404; 84/600; 215/11.1; 248/102

(58) Field of Search ............................ 446/74, 81, 227, 446/267, 397, 404; 84/600, 609, 644; 215/11.1, 393; 248/102, 103, 105, 314, 315; 206/523

(56) References Cited

U.S. PATENT DOCUMENTS

| | | | | |
|---|---|---|---|---|
| 3,901,384 A | * | 8/1975 | Lee et al. | 206/523 |
| 4,898,060 A | * | 2/1990 | To | 446/227 |
| 4,944,704 A | * | 7/1990 | Grace | 446/267 |
| 5,143,338 A | * | 9/1992 | Eberlin | 248/315 |
| 5,344,034 A | * | 9/1994 | Eagan | 446/227 |
| 5,467,877 A | * | 11/1995 | Smith | 215/11.1 |
| 5,662,406 A | * | 9/1997 | Mattice et al. | 215/11.1 |
| 5,664,745 A | * | 9/1997 | Hadaway | 248/105 |
| 5,842,901 A | * | 12/1998 | Montgomery | 446/267 |

* cited by examiner

*Primary Examiner*—Jacob K. Ackun
(74) *Attorney, Agent, or Firm*—Michael I Kroll

(57) ABSTRACT

The present invention 10 discloses a musical adapter for baby bottles 12. The musical adapter 10 is comprised of a housing 20 having a cavity for placing the base of a baby bottle 12 therein. The housing 20 has a rotatable lock ring 22 disposed within a threaded cap 24 for fixedly positioning the musical adapter to the baby bottle 12. The cavity within the musical adapter housing has an insert plate 36 for sealing the housing cavity. The lock ring 22 has a plurality of leaf-like springs 28 thereon. As the lock ring 22 is rotated the leaf-like springs 28 engage the multiple tangs 40 of the threaded cap 24 thereby forcing the leaf-like springs 28 inwardly so as to engage the bottle 12 therein, thereby decreasing the available diameter for the baby bottle 12 therein and crimping the bottle 12 between a plurality of leaf-like spring elements 28. Within the base of the housing 20 is a compartment 30 having a removable insert plate 36. The compartment 30 has frictional foam retaining members 34 for fixedly holding an electronic musical module 32 that generates a musical sequence. The playing of the tune is accomplished by pressing on the base 18 of the musical adapter 10.

14 Claims, 8 Drawing Sheets

MUSICAL ADAPTER FOR BABY BOTTLES

BACKGROUND OF THE INVENTION

1. Field of the Invention

The present invention relates generally to baby bottles and, more specifically, to a musical adapter for baby bottles. The musical adapter is comprised of a housing having a cavity for placing the base of a baby bottle therein. The housing has a rotatable lock ring for fixedly positioning the musical adapter to the baby bottle. The cavity within the musical adapter housing has an insert plate for sealing the housing cavity. The lock ring has a leaf-like spring. As the lock ring is rotated the leaf-like spring engages the tang of the threaded cap thereby forcing the leaf-like spring to engage the bottle therein. Thereby decreasing the available circumference for the baby bottle therein and crimping the bottle between a plurality of leaf-like lock ring elements.

This closure mechanism permits varied size baby bottle to be inserted and crimped to the musical adapter.

Within the base of the housing is a compartment having a removable insert plate. The compartment has frictional retaining members for fixedly holding an electronic module that generates a musical sequence. The playing of said tune is accomplished by pressing on the base of the musical adapter. The module will play the sound byte for a predetermined period of time. It will also be possible to purchase additional sound bytes that can be selectively inserted by removing the insert cover and replacing the first electronic module with a second electronic module 2. Description of the Prior Art There are other musical devices designed for baby bottles. Typical of these is U.S. Pat. No. 4,295,293 issued to Baclit on Oct. 20, 1981.

Another patent was issued to Bender on Oct. 14, 1986 as U.S. Pat. No. 4,616,795. Yet another U.S. Pat. No. 4,678,093 was issued to Allen on Jul. 7, 1987 and still yet another was issued on Feb. 6, 1990 to To as U.S. Pat. No. 4,898,060.

Another patent issued to Grace on Jul. 31, 1990 as U.S. Pat. No. 4,944,704. Yet another U.S. Pat. No. 5,312,282 was issued to Cooper on May 17, 1994. Another was issued to Eagan on Sep. 6, 1990 U.S. Pat. No. 5,344,03. Another was issued on Sep. 9, 1997 to Hadaway as U.S. Pat. No. 5,664,745 and still yet another was issued on Jan. 10, 1995 to Smith et al. U.S. Pat. No. Des. 354,202.

U.S. Pat. No. 4,295,293

Inventor: Paul S. Baclit

Issued: Oct. 20, 1981

The device includes a main support member in the form of a shell which fits over the body of the infant when the infant is lying down; an upright bottle support removably mounted on the main support for mounting the bottle, this bottle support having a caricature thereon such as of an animal; a bottle carriage on the bottle support, pivoted between an active position in which an infant feeds, and an inactive position in which it is inclined away from the infant's face, and having a weight for moving it to inactive position when the bottle is released; the bottle support includes a music box which is activated by the bottle carriage when the latter is moved to inactive position; and the main support while carrying the bottle support is demountably positionable on a pull-toy, such as a buggy which, together as a combination toy can be enjoyed by an older child.

U.S. Pat. No. 4,616,795

Inventor: Larry J. Bender

Issued: Oct. 14, 1986

A nursing bottle holder which is adaptable for use with a crib as well as a high chair, stroller, car seat or the like is provided. The preferred embodiment is an adjustable bottle holder which maintains the nursing bottle in the desired location and feeding angle while it keeps the infants attention through the corporation of brightly colored beads, keeps the infant soothed through the incorporation of a music box, and serves as a storage receptacle for bottles, pacifiers, diapers and other items frequently used in connection with infant feeding.

U.S. Pat. No. 4,678,093

Inventor: Sammy G. Allen

Issued: Jul. 7, 1987

A musical baby bottle comprising a nipple, a liquid container connected to the nipple, a base section fastened to an opening at the bottom of the liquid container, a microchip having musical information fastened to the interior of the base section, a speaker electrically connected to the microchip and fastened to the interior of the base section, a battery electrically connected to the microchip and fastened to the interior of the base section, and a switch electrically connected to the microchip for selectively activating the microchip. The switch comprises a mercury switch fixedly positioned within the base section. The mercury switch is tilted such that the off-position of the switch is closer to the bottom of the base section than is the on-position of the mercury switch. A second mercury switch is positioned within the base section and is angularly offset from the first mercury switch. A third mercury switch is also fixedly positioned within the base section and is also angularly offset from the other mercury switches. An insulative fill material is fastened to the base section such that the microchip, the speaker, the battery, and the switch are inaccessible from the exterior of the base section.

U.S. Pat. No. 4,898,060

Inventor: Ping K. To

Feb. 6, 1990

A musical adapter for use with a nursing bottle comprising an upper portion and a lower portion, which two portions being detachably joined together to form a single body. An electronic musical device of integrated circuits is disposed in the interior space of the lower portion and is capable of producing a medodious tune upon the bottle being lifted or tipped up.

U.S. Pat. No. 4,944,704

Inventor: Carol Grace

Issued: Jul. 31, 1990

A musical nurser includes a bottle portion having a detachable base and a removable nipple opposite the base. A music box is mounted within the detachable base, and a removable cap is provided for enclosing the nipple. The bottle portion, the detachable musical base and the removable cap are each shaped so as to form, when assembled, a unitary structure having a toy-like shape.

U.S. Pat. No 5,312,282

Inventor: Lynn Cooper

Issued: May 17, 1994

The invention relates to a baby bottle structure forming a doll. The baby bottle comprises a central fluid receptacle having a nipple portion at one end and a bottom portion at the opposing end. A removable cover is snapped about the nipple portion and forms the head of a doll. A removable bottom portion is attachable to the central fluid receptacle of the bottle and creates the feet portion of the doll. The feet of the doll are formed in such a way as to support the bottle in an upright position. The removable bottom support structure houses a music module that may be activated by tilting the baby bottle. The bottom portion also provides a housing for enclosing an independent pacifier. Thus, the baby bottle forms a musical doll and provides means for carrying a pacifier within its body structure. A bib is provided with the baby bottle doll and supports the baby bottle about the neck of an infant. A rattle or rattles may be removably attachable to the bib and form arms of the doll.

U.S. Pat. No. 5,344,034

Inventor: Chris S. Eagan

Issued: Sep. 6, 1994

An electronic musical adapter for removable attachment to a baby nursing bottle to produce a musical tune to soothe and amuse the baby upon movement of the bottle during the feeding process. The adapter comprising a cup-shaped housing, a melody producing circuit including an integrated circuit microchip within which is stored musical tune information, a battery power source, a buzzer-type speaker and a motion-activated microswitch for activating the microchip, and a wafer-like container encapsulating the melody producing circuit removably situated within the cup-shaped housing proximate the bottom thereof.

U.S. Pat. No. 5,664,745

Inventor: Sharon Hadaway

Issued: Sep. 9, 1997

The present invention provides for a baby bottle adapter for releasable attachment to the bottom of the baby bottle, the adapter being capable of playing a musical melody when activated. The adapter includes a top chamber of a size and shape to accept the bottom of a baby bottle, the top chamber being formed from a side wall and a bottom provided by an internal divider located with the adapter. The adapter also has a bottom chamber located below the top chamber, the bottom chamber being sealed against liquid infiltration and containing means for playing a musical melody upon activation. The bottom chamber is formed from the side wall and the internal divider of the adapter and a base attached to the bottom of the adapter. The base is provided with an opening through which an activating means passes, the activation means having a contact surface for contact and activation of the means for playing the musical melody, the activating means being surrounded by an elastomeric sealing material which extends beyond the opening on either side of the base surrounding the opening to seal the opening against infiltration of liquid into the lower chamber.

U.S. Pat. No. Des. 354,202

Inventor: Phyllis L. Smith et al.

Issued: Jan. 10, 1995

This United States Patent an ornamental design for a musical bottle holder as illustrated in the drawings of the patent.

While these musical devices may be suitable for the purposes for which they were designed, they would not be as suitable for the purposes of the present invention, as hereinafter described.

SUMMARY OF THE PRESENT INVENTION

The present invention discloses a musical adapter for baby bottles. The musical adapter is comprised of a housing having a cavity for placement of the base of a baby bottle therein. The housing has a rotatable lock ring disposed within a threaded cap for fixedly positioning the musical adapter to the baby bottle. The cavity within the musical adapter housing has an insert plate for sealing the housing cavity. The lock ring has a plurality of leaf-like springs thereon. As the lock ring is rotated the leaf-like springs engage the tangs of the threaded cap thereby forcing the leaf-like springs inwardly so as to engage the bottle therein, thereby decreasing the available diameter for the baby bottle therein and crimping the bottle between a plurality of leaf-like spring elements. Within the base of the housing is a compartment having a removable insert plate. The compartment has frictional foam retaining members for fixedly holding an electronic musical module that generates a musical sequence. The playing of the tune is accomplished by pressing on the base of the musical adapter.

A primary object of the present invention is to provide a musical adapter for baby bottles.

Another object of the present invention is to provide a musical adapter for various baby bottles having differing base diameters.

Yet another object of the present invention is to provide a musical adapter having replaceable tone generating electronic modules.

Still yet another object of the present invention is to provide a musical adapter that will play a musical sequence by depressing the base of the musical adapter.

Another object of the present invention is to provide a musical adapter having a housing member having a cavity for inserting a baby bottle therein.

Yet another object of the present invention is to provide a musical adapter having a compartment having an insert cover providing means for accessing the electronic musical module.

Still yet another object of the present invention is to provide a musical adapter housing having a frictional element for fixedly positioning a musical electronic module therebetween.

Another object of the present invention is to provide a musical adapter having an easily accessible an replaceable musical electronic module contained therein.

Yet another object of the present invention is to provide a musical adapter having a rotatable locking element.

Still yet another object of the present invention is to provide a musical adapter having a rotatable locking element having a plurality of leaf-like springs which can be selectively extended or retracted.

Another object of the present invention is to provide a threaded cap having a centrally positioned aperture having a plurality of tangs for engaging the leaf-like springs of the lock ring.

Yet another object of the present invention is to provide a musical adapter locking element that engages the threaded cap member.

Still yet another object of the present invention is to provide a musical adapter having a threaded cap member and locking element whereby rotation of the locking element will reduce the available circumference of the musical adapter bottle cavity.

Another object of the present invention is to provide a musical adapter having a threaded cap and locking ring that will frictionally engage a previously inserted baby bottle.

Additional objects of the present invention will appear as the description proceeds.

The present invention overcomes the shortcomings of the prior art by providing a musical adapter for baby bottles having a housing having a cavity for inserting the base of a baby bottle therein. The musical adapter has a rotatable lock ring for fixedly positioning the musical adapter to a baby bottle. The musical adapter housing cavity has interior threads for threadedly engaging the exterior threads of the cap. Located on the interior wall of the threaded cap are a plurality of tangs. As the lock ring is rotated the tangs force the leaf-like springs of the lock ring to centrally extend until frictionally engaging the baby bottle. Thereby, various diametered baby bottles can be fixedly inserted therein.

Also the housing has as an accessible compartment having frictional elements retaining a musical electronic module therebetween. The musical electronic module can be replaced with a plurality of like modules having different musical sequences.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
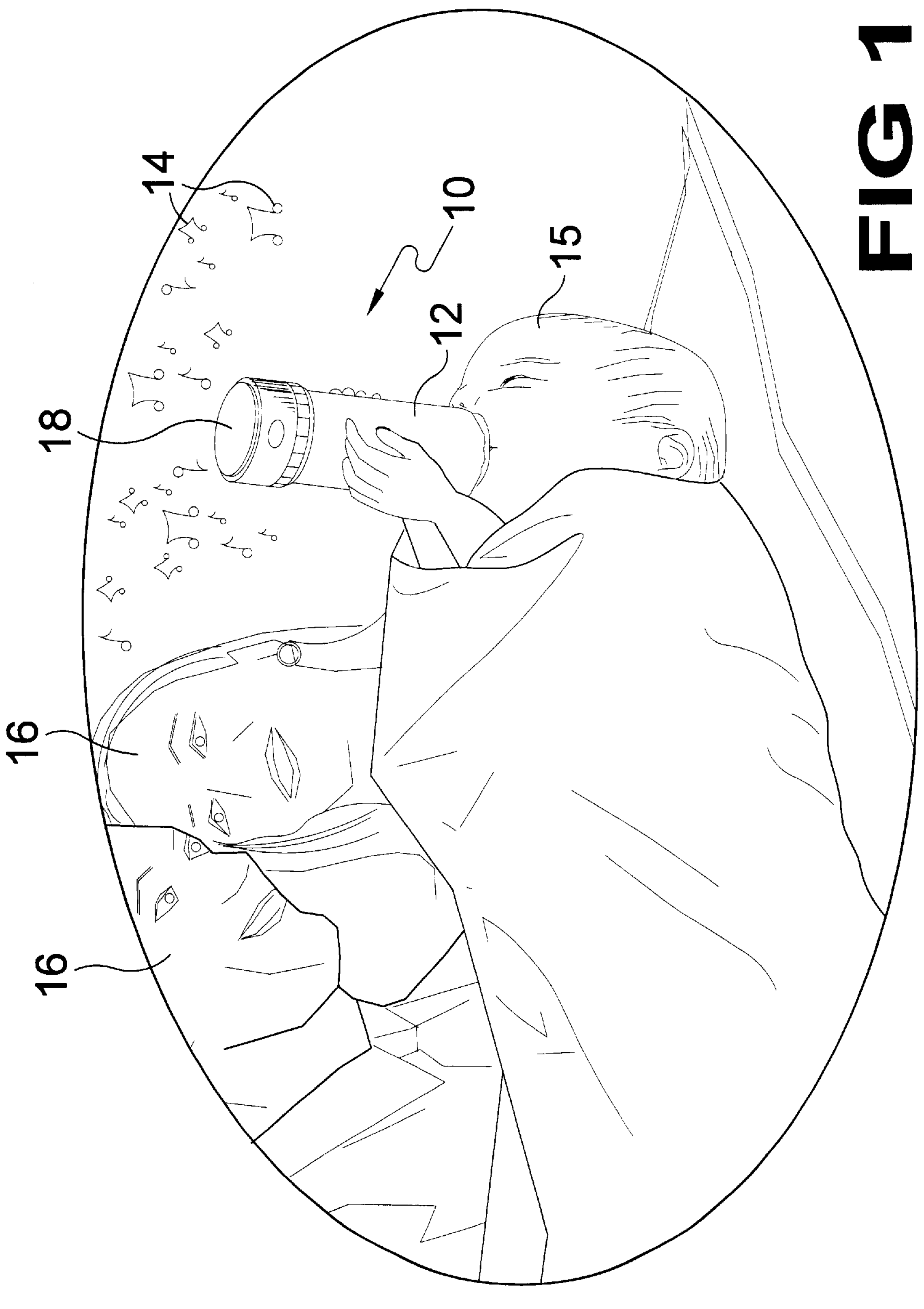
FIG. 1 is an illustrative view of the present invention in use.

With regard to reference numerals used, the following numbering is used throughout the drawings.

10 present invention
12 bottle
14 note
15 baby
16 individual
18 base
20 housing
22 locking ring
24 threaded cap
26 aperture
28 springs
30 compartment
32 musical module
34 musical module holding element
36 insert plate
38 mating threads
40 tang
channel
arrow
serrations or teeth

DESCRIPTION OF THE PREFERRED EMBODIMENT(S)

In order that the invention may be more fully understood, it will now be described, by way of example, with reference to the accompanying drawings in which FIGS. 1 through 8 illustrate the present invention being a musical adapter for baby bottles.

Turning to FIG. 1, shown therein is an illustrative view of the present invention 10 in use. Shown is the musical adapter 10 fixedly positioned at the base of a baby bottle 12 in use by a baby 15. The musical adapter is playing the recorded musical sequence shown by notes 14 having been activated by one of the individuals 16, shown within the illustration having pressed on the base 18 of the musical adapter. The musical sequence will play for a predetermined period of time.

Figure 2:
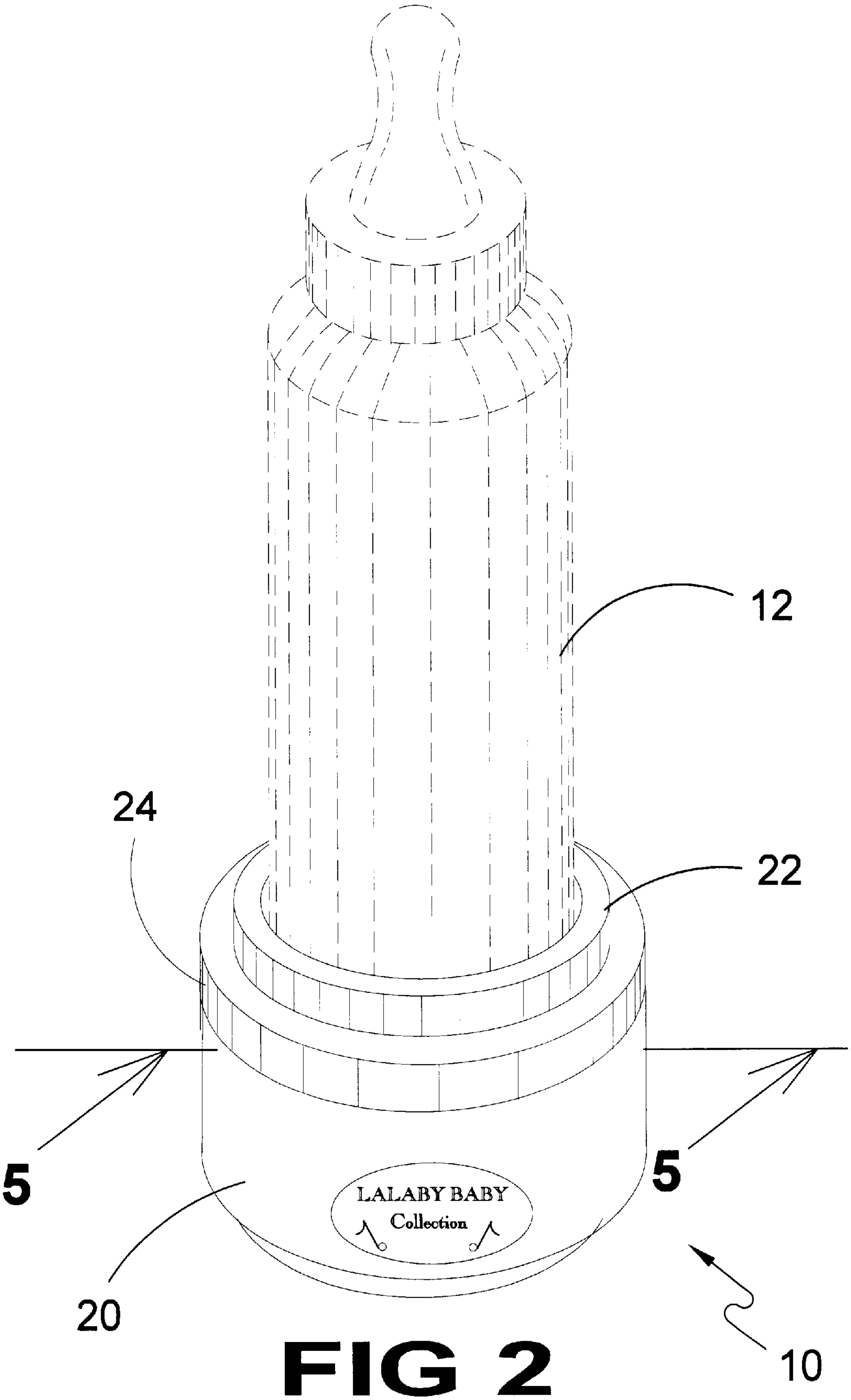
FIG. 2 is a perpective view of the present invention.

Turning to FIG. 2, shown therein is a perspective view of the present invention 10 installed on a baby bottle 12. Shown is the musical adapter having a housing member 20 having a musical electronic module (not shown) therein. The musical sequence is initiated by depressing the base element whereby the musical sequence will play for a predetermined period of time. The musical adapter has a locking ring 22 which cooperates with a threaded cap 24 to cause the musical adapter to frictionally grip the baby bottle 12.

Figure 3:
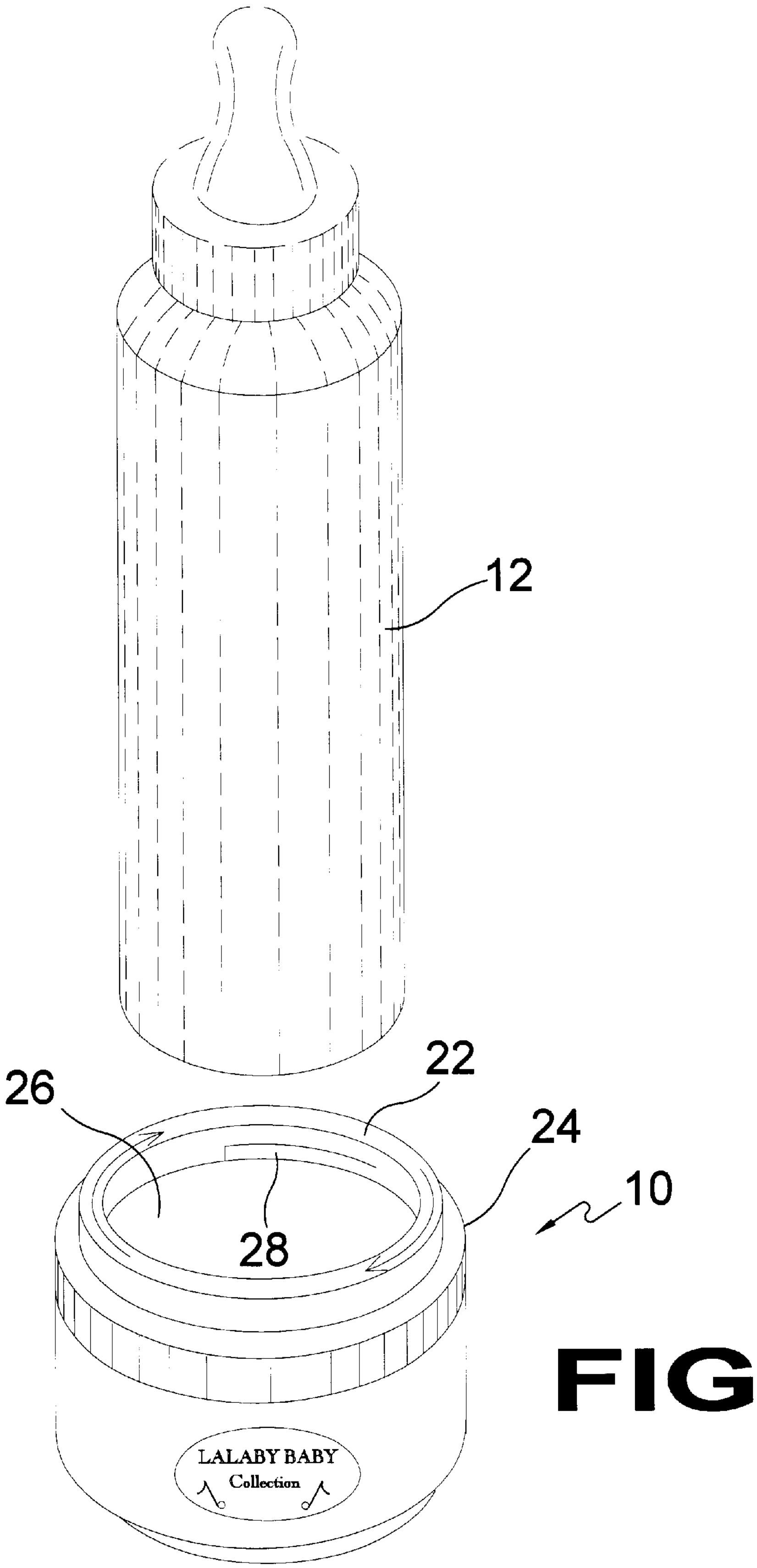
FIG. 3 is a perspective view of the present invention showing the locking mechanism.

Turning to FIG. 3, shown therein is a perspective view of the baby bottle 12 removed from the musical adapter 10. Shown is the lock ring 22 having an aperture 26 wherein is inserted a baby bottle 12. After the bottle 12 is inserted the lock ring 22 is rotated clockwise which will cause the plurality of tangs (not shown) positioned on the threaded cap 24 to move the plurality of lock ring leaf-like springs 28 toward the center of the aperture 26 where they will frictionally engage the baby bottle 12.

Figure 4:
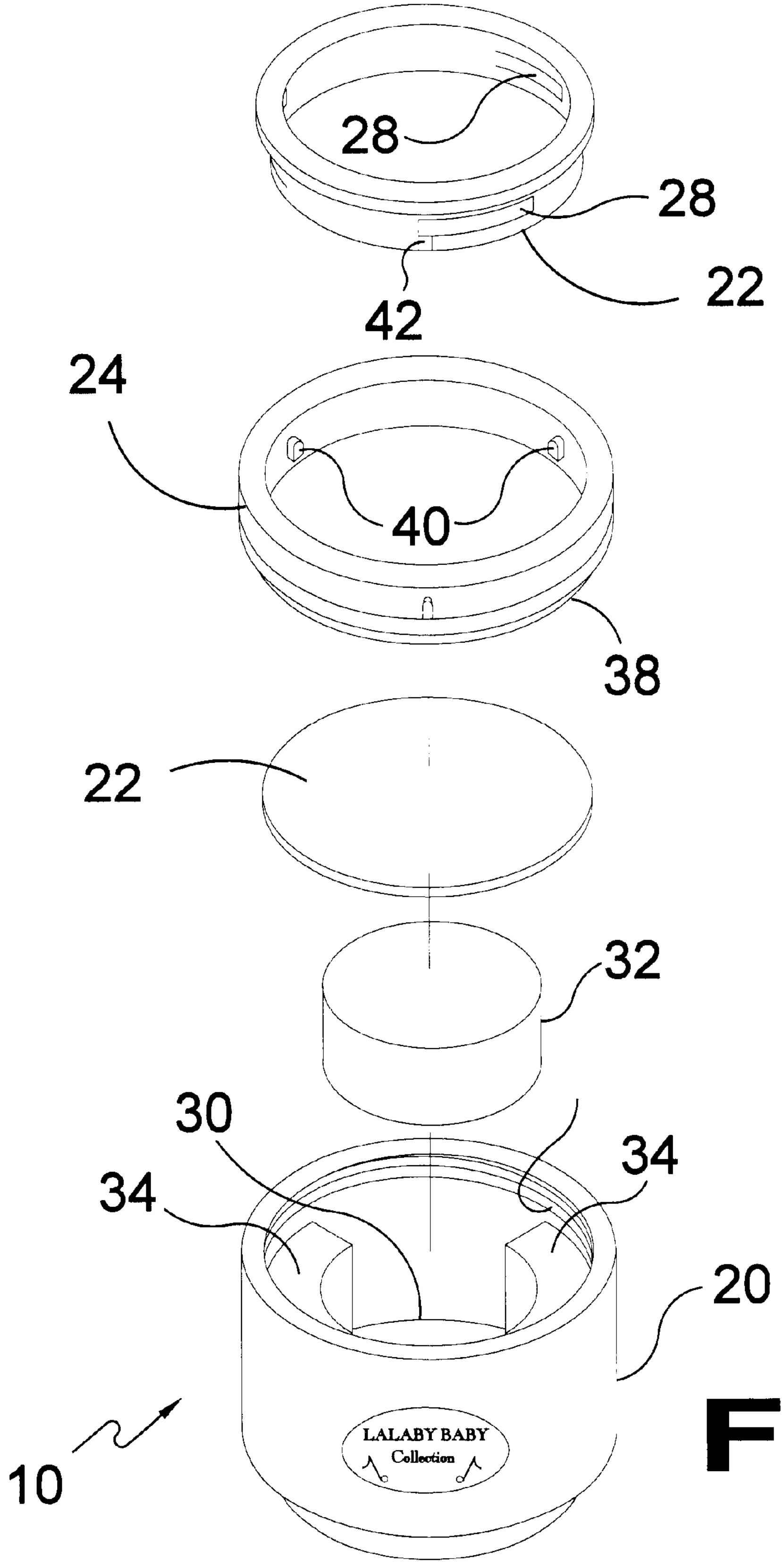
FIG. 4 is an exploded view of the present invention.

Turning to FIG. 4, shown therein is an exploded view of the musical adapter 10 showing a housing member 20 having a compartment 30 having a musical electronic module 32 with foam frictional holding elements 34 positioned therein. The musical electronic module 32 is inserted into the compartment 30 fixedly positioned therein by the foam frictional holding elements 34. The compartment 30 is closed by an insert plate 36 (see FIG. 5) which rests upon the frictional holding elements 34. The threaded cap 24 having mating threads 38 threadedly engages the musical adapter housing member 20. The lock ring 22 is inserted into the threaded cap 24 having the multiple tangs 40 of the threaded cap 24 inserted into the channed 42 located at the distal end of the leaf-like spring elements 28 of the lock ring 22.

Figure 5:
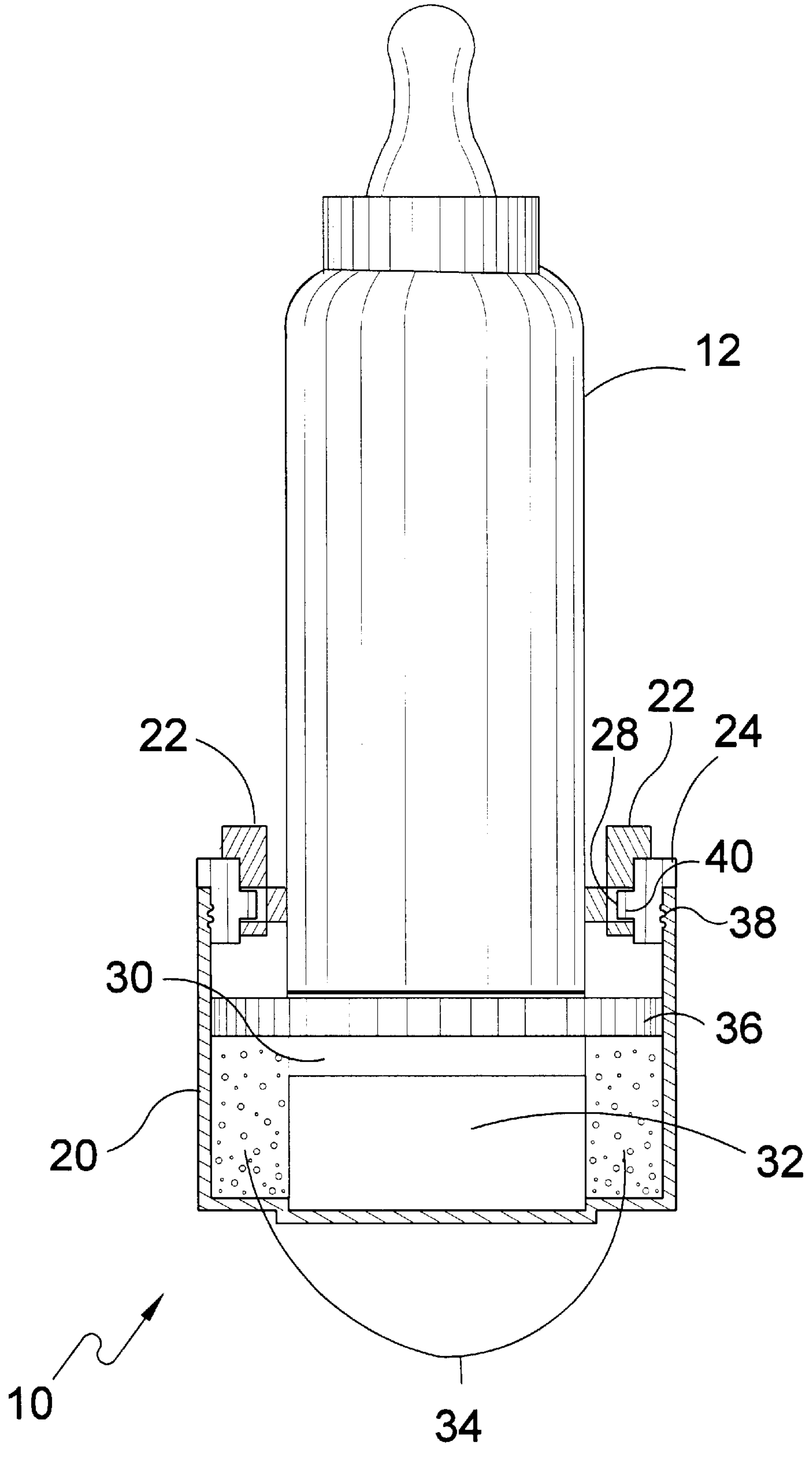
FIG. 5 is a cross sectional view of the present invention taken from FIG. 5 as indicated.

Turning to FIG. 5, shown therein is a cross sectional view of the present invention 10 taken from FIG. 2 as indicated. Shown are the musical adapter housing member 20 having a compartment 30 therein having frictional foam holding elements 34 and a musical electronic module 32 positioned therebetween. The compartment has an insert plate 36 that closes the housing compartment 30 from liquids. The housing 20 further has inwardly disposed internal mating threads 38 whereby a mating threaded cap 24 is threadedly attached. The threaded cap has a plurality of centrally disposed tangs 40 that move the leaf-like springs 28 of the lock ring 22 inwardly to frictionally engage a baby bottle 12 therein.

Figure 6:
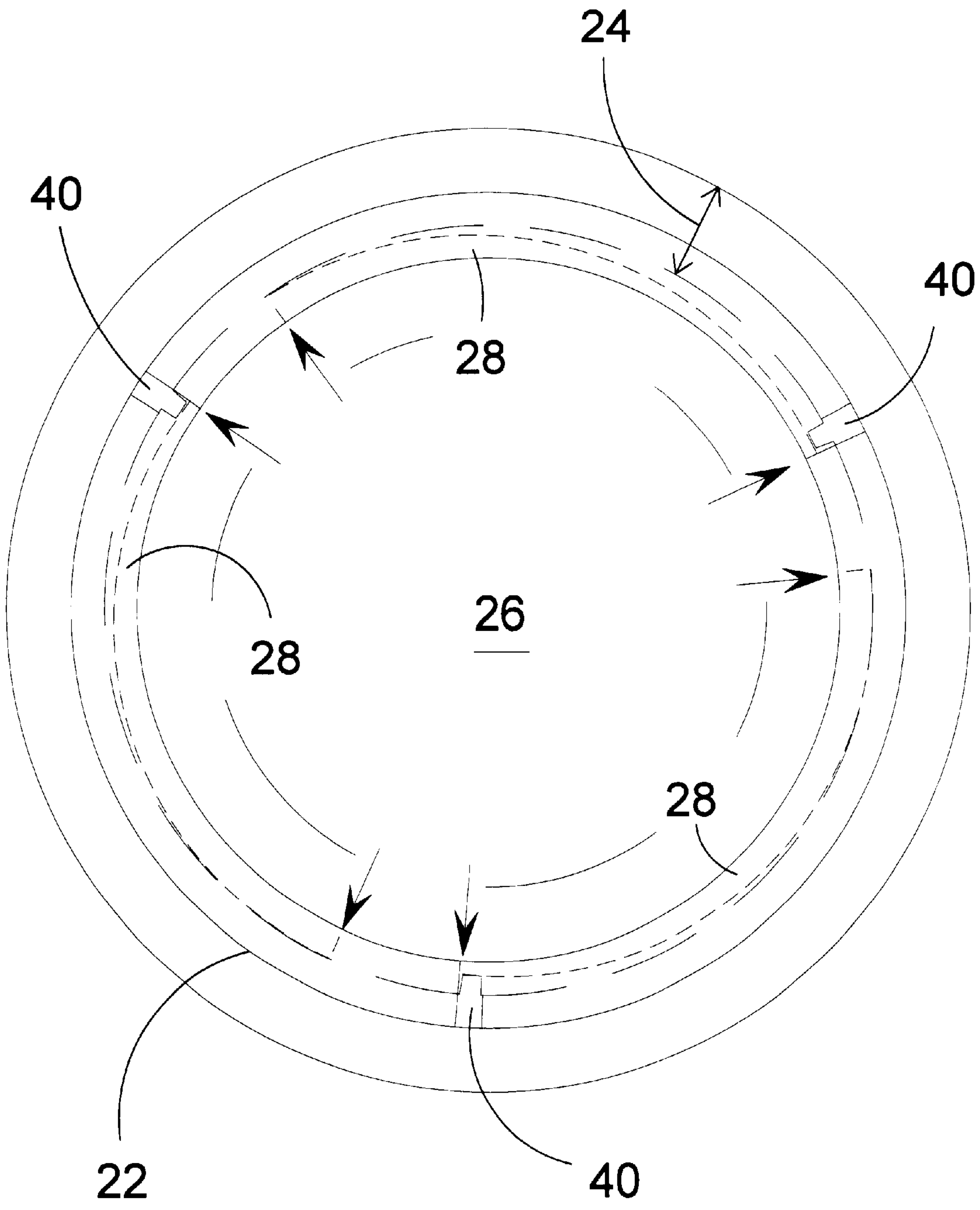
FIG. 6 is a top view of the present invention having the locking mechanism disengaged.

Turning to FIG. 6, shown therein is a top view of the threaded cap 24 and the lock ring 22 in the open position. The tangs 40 of the threaded cap 24 are positioned in a cavity at one distal end of the leaf-like spring 28. As the lock ring 22 rotates the tangs 40 push the springs 28 inwardly which thereby decrease the diameter of the lock ring aperture 26.

Figure 7:
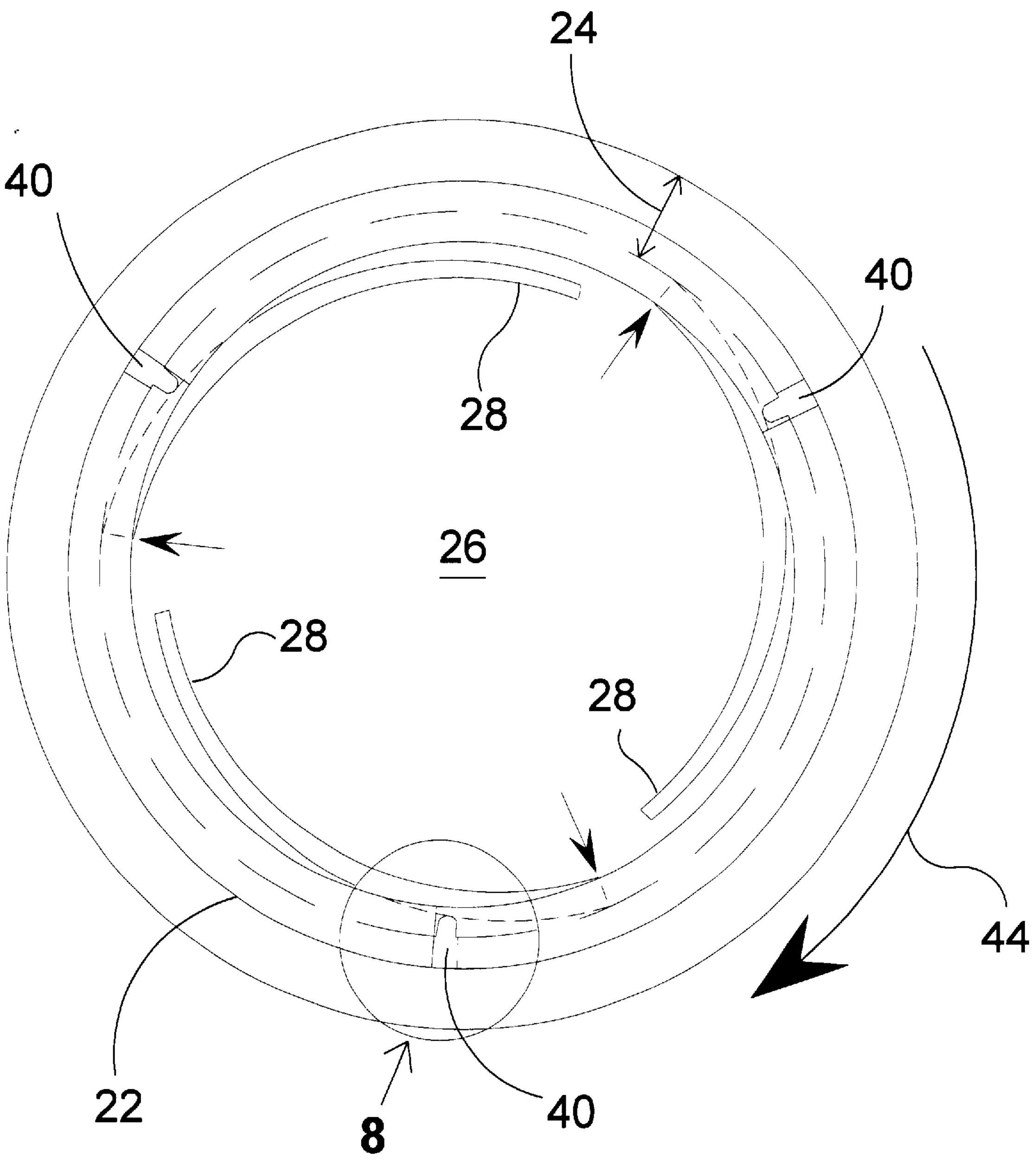
FIG. 7 is a top view of the present invention showing the locking mechanism engaged.

Turning to FIG. 7, shown therein is a top view of the threaded cap 24 and the lock ring 22 in the closed position. The tangs 40 of the threaded cap 24 force the leaf-like springs 28 of the lock ring toward the centrally disposed aperture 26. The leaf-like spring 28 will frictionally engage the baby bottle (not shown) at a plurality of points. Arrow 44 indicates the lock ring 22 rotation.

Figure 8:
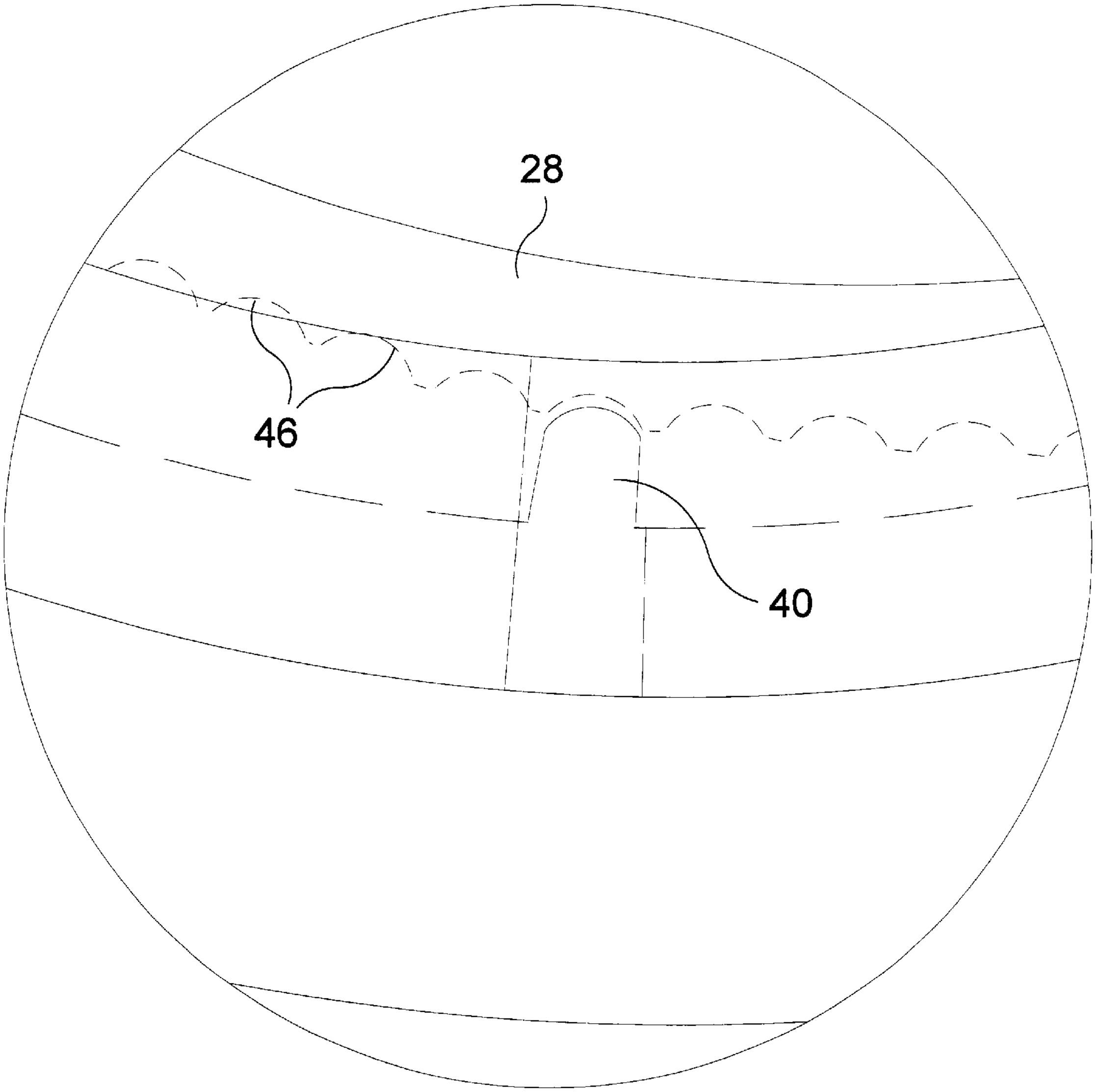
FIG. 8 is an enlarged view of one of the locking tangs engaging one of the fluted frictional locking members.

Turning to FIG. 8, shown therein is an enlarged view of the engagement between the threaded cap tang 40 and the lock ring leaf-like spring 28. The plurality of teeth or serrations 46 will prevent the lock ring spring 28 from accidental engagement or disengagement.

What is claimed to be new and desired to be protected by Letters Patent is set forth in the appended claims.

I claim:

1. An apparatus for a musical adapter for placement onto a baby bottle, comprising:

a) a cylindrical base housing, said housing being open on a first end and closed on a second end;

b) a musical module disposed in said housing being disc-shaped and complementarily sized to fit within said housing;

c) means comprising a pair of foam members disposed on opposite sides of said module for retaining said module within said housing;

d) a threaded cap ring disposed in said first end of said housing; and, e) a lock ring disposed in said threaded cap ring, said lock ring cooperating with said threaded cap ring to fixedly secure a baby bottle therein.

2. The apparatus of claim 1, wherein said housing further comprises inner threads on said first end.

3. The apparatus of claim 1, wherein said housing further comprises a button on said second end.

4. The apparatus of claim 3, wherein said button activates said musical module.

5. The apparatus of claim 1, wherein each of said pair of foam members are sized to fit between an outer edge of said disc-shaped module and said housing wherein said foam members frictionally secure said disc-shaped module internal said housing.

6. The apparatus of claim 5, wherein said means for retaining said module further comprises an insert plate disposed between said module and said first end of said housing, said plate removably fixed so as to secure said module in said housing.

7. The apparatus of claim 2, wherein said threaded cap ring comprises mating threads for mating to said inner threads on said first end of said housing.

8. The apparatus of claim 7, wherein said threaded cap ring has an inner surface, said threaded cap ring further comprises a plurality of inwardly projecting tangs disposed on said inner surface.

9. The apparatus of claim 8, wherein said lock ring further comprises multiple leaf springs for cooperation with said tangs to fixedly secure a baby bottle therein, said springs disposed in the wall of said lock ring, said lock ring complementarily sized to said inner surface of said threaded cap ring.

10. The apparatus of claim 9, wherein said multiple leaf springs move in the horizontal plane.

11. The apparatus of claim 10, wherein said multiple leaf springs each have a first end fixedly disposed in the wall of said lock ring and a second end inwardly movable in response to contact with said tang.

12. The apparatus of claim 11, wherein the diameter of the aperture of said lock ring decreases as said second end of said springs move inwardly so as to fixedly secure a baby bottle therein.

13. The apparatus of claim 12, said lock ring having a plurality of channels therein, said channels disposed in the wall of said lock ring so as to each receive one of said tangs thereby allowing said lock ring to seat within said threaded cap ring.

14. The apparatus of claim 13, wherein said springs further comprise a plurality of serrations thereon, said serrations being complementarily shaped as said tangs so as to receive and cooperate with said tangs so that said springs are movably secured to said tangs, said serrations disposed adjacent each other along the length of said spring.

* * * * *